US012538287B2

(12) United States Patent
He et al.

(10) Patent No.: US 12,538,287 B2
(45) Date of Patent: Jan. 27, 2026

(54) BEAM MANAGEMENT USING MULTIPLE SETS OF CHANNEL STATE INFORMATION REFERENCE SIGNALS AND CHANNEL QUALITY INDICATOR REPORTING

(71) Applicant: QUALCOMM Incorporated, San Diego, CA (US)

(72) Inventors: Ruhua He, San Diego, CA (US); Derrick Albert Chu, San Diego, CA (US); Raghu Narayan Challa, San Diego, CA (US); Alexei Yurievitch Gorokhov, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 442 days.

(21) Appl. No.: 18/157,659

(22) Filed: Jan. 20, 2023

(65) Prior Publication Data

US 2024/0251397 A1    Jul. 25, 2024

(51) Int. Cl.
*H04W 72/044* (2023.01)
*H04L 5/00* (2006.01)

(52) U.S. Cl.
CPC ......... *H04W 72/046* (2013.01); *H04L 5/0053* (2013.01)

(58) Field of Classification Search
CPC ............................ H04W 72/046; H04L 5/0053
See application file for complete search history.

(56) References Cited

U.S. PATENT DOCUMENTS

| 2015/0043419 | A1* | 2/2015 | Boudreau | H04B 7/024 370/315 |
| 2019/0053313 | A1* | 2/2019 | Zhou | H04W 52/50 |
| 2019/0215048 | A1* | 7/2019 | Cirik | H04W 74/0833 |
| 2019/0349051 | A1* | 11/2019 | Sarkis | H04B 7/0626 |
| 2020/0389221 | A1* | 12/2020 | He | H04W 4/00 |
| 2022/0070940 | A1* | 3/2022 | Taherzadeh Boroujeni | H04L 5/0044 |
| 2022/0131587 | A1* | 4/2022 | Zhou | H04L 5/0048 |

* cited by examiner

*Primary Examiner* — Duc C Ho
(74) *Attorney, Agent, or Firm* — Harrity & Harrity, LLP

(57) ABSTRACT

Various aspects of the present disclosure generally relate to wireless communication. In some aspects, a user equipment (UE) may receive, during a beam management procedure, multiple sets of channel state information reference signals (CSI-RSs). The UE may receive multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs. The UE may transmit multiple channel quality indicator (CQI) reports based at least in part on the multiple CSI-RSs, wherein one CQI report of the multiple CQI reports is based at least in part on the one CSI-RS of the multiple CSI-RSs. Numerous other aspects are described.

30 Claims, 11 Drawing Sheets

BEAM MANAGEMENT USING MULTIPLE SETS OF CHANNEL STATE INFORMATION REFERENCE SIGNALS AND CHANNEL QUALITY INDICATOR REPORTING

FIELD OF THE DISCLOSURE

Aspects of the present disclosure generally relate to wireless communication and to techniques and apparatuses for beam management using multiple sets of channel state information reference signals (CSI-RSs) and channel quality indicator (CQI) reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, during a beam management procedure, multiple sets of channel state information reference signals (CSI-RSs), wherein each set of CSI-RSs is associated with a same network node transmit beam; receive multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs; and transmit multiple channel quality indicator (CQI) reports based at least in part on the multiple CSI-RSs, wherein one CQI report of the multiple CQI reports is based at least in part on the one CSI-RS of the multiple CSI-RSs.

In some implementations, an apparatus for wireless communication at a network node includes a memory and one or more processors, coupled to the memory, configured to: transmit, during a beam management procedure, multiple sets of CSI-RSs, wherein each set of CSI-RSs is associated with a same network node transmit beam; transmit multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs; and receive multiple CQI reports based at least in part on the multiple CSI-RSs, wherein one CQI report of the multiple CQI reports is based at least in part on the one CSI-RS of the multiple CSI-RSs.

In some implementations, a method of wireless communication performed by a UE includes receiving, during a beam management procedure, multiple sets of CSI-RSs, wherein each set of CSI-RSs is associated with a same network node transmit beam; receiving multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs; and transmitting multiple CQI reports based at least in part on the multiple CSI-RSs, wherein one CQI report of the multiple CQI reports is based at least in part on the one CSI-RS of the multiple CSI-RSs.

In some implementations, a method of wireless communication performed by a network node includes transmitting, during a beam management procedure, multiple sets of CSI-RSs, wherein each set of CSI-RSs is associated with a same network node transmit beam; transmitting multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs; and receiving multiple CQI reports based at least in part on the multiple CSI-RSs, wherein one CQI report of the multiple CQI reports is based at least in part on the one CSI-RS of the multiple CSI-RSs.

In some implementations, a non-transitory computer-readable medium storing a set of instructions for wireless communication includes one or more instructions that, when executed by one or more processors of a UE, cause the UE to: receive, during a beam management procedure, multiple sets of CSI-RSs, wherein each set of CSI-RSs is associated with a same network node transmit beam; receive multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs; and transmit multiple CQI reports based at least in part on the multiple CSI-RSs, wherein one CQI report of the multiple CQI reports is based at least in part on the one CSI-RS of the multiple CSI-RSs.

In some implementations, a non-transitory computer-readable medium storing a set of instructions for wireless communication includes one or more instructions that, when executed by one or more processors of a network node, cause the network node to: transmit, during a beam management procedure, multiple sets of CSI-RSs, wherein each set of CSI-RSs is associated with a same network node transmit beam; transmit multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs; and receive multiple CQI reports based at least in part on the multiple CSI-RSs, wherein one CQI report of the multiple CQI reports is based at least in part on the one CSI-RS of the multiple CSI-RSs.

In some implementations, an apparatus for wireless communication includes means for receiving, during a beam management procedure, multiple sets of CSI-RSs, wherein each set of CSI-RSs is associated with a same network node transmit beam; means for receiving multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs; and means for transmitting multiple CQI reports based at least in part on the multiple CSI-RSs, wherein one CQI report of the multiple CQI reports is based at least in part on the one CSI-RS of the multiple CSI-RSs.

In some implementations, an apparatus for wireless communication includes means for transmitting, during a beam management procedure, multiple sets of CSI-RSs, wherein each set of CSI-RSs is associated with a same network node transmit beam; means for transmitting multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs; and means for receiving multiple CQI reports based at least in part on the multiple CSI-RSs, wherein one CQI report of the multiple CQI reports is based at least in part on the one CSI-RS of the multiple CSI-RSs.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
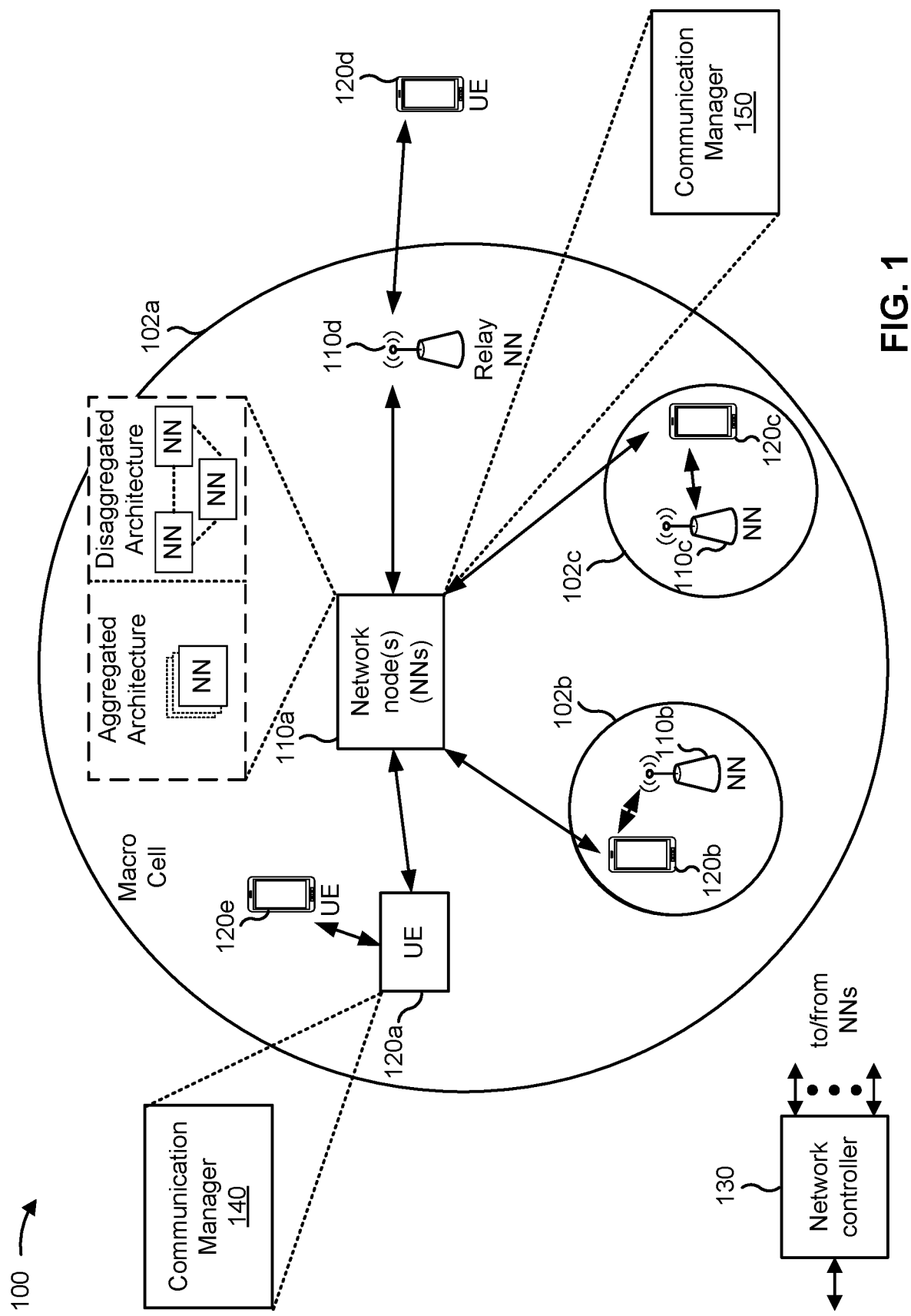
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, during a beam management procedure, multiple sets of channel state information reference signals (CSI-RSs), wherein each set of CSI-RSs is associated with a same network node transmit beam; receive multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs; and transmit multiple channel quality indicator (CQI) reports based at least in part on the multiple CSI-RSs, wherein one CQI report of the multiple CQI reports is based at least in part on the one CSI-RS of the multiple CSI-RSs. Additionally, or alternatively, the communication manager 140 may perform one or more other operations described herein.

In some aspects, a network node (e.g., network node 110) may include a communication manager 150. As described in more detail elsewhere herein, the communication manager 150 may transmit, during a beam management procedure, multiple sets of CSI-RSs, wherein each set of CSI-RSs is associated with a same network node transmit beam; transmit multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs; and receive multiple CQI reports based at least in part on the multiple CSI-RSs, wherein one CQI report of the multiple CQI reports is based at least in part on the one CSI-RS of the multiple CSI-RSs. Additionally, or alternatively, the communication manager 150 may perform one or more other operations described herein.

As indicated above, FIG. 1 is provided as an example. Other examples may differ from what is described with regard to FIG. 1.

Figure 2:
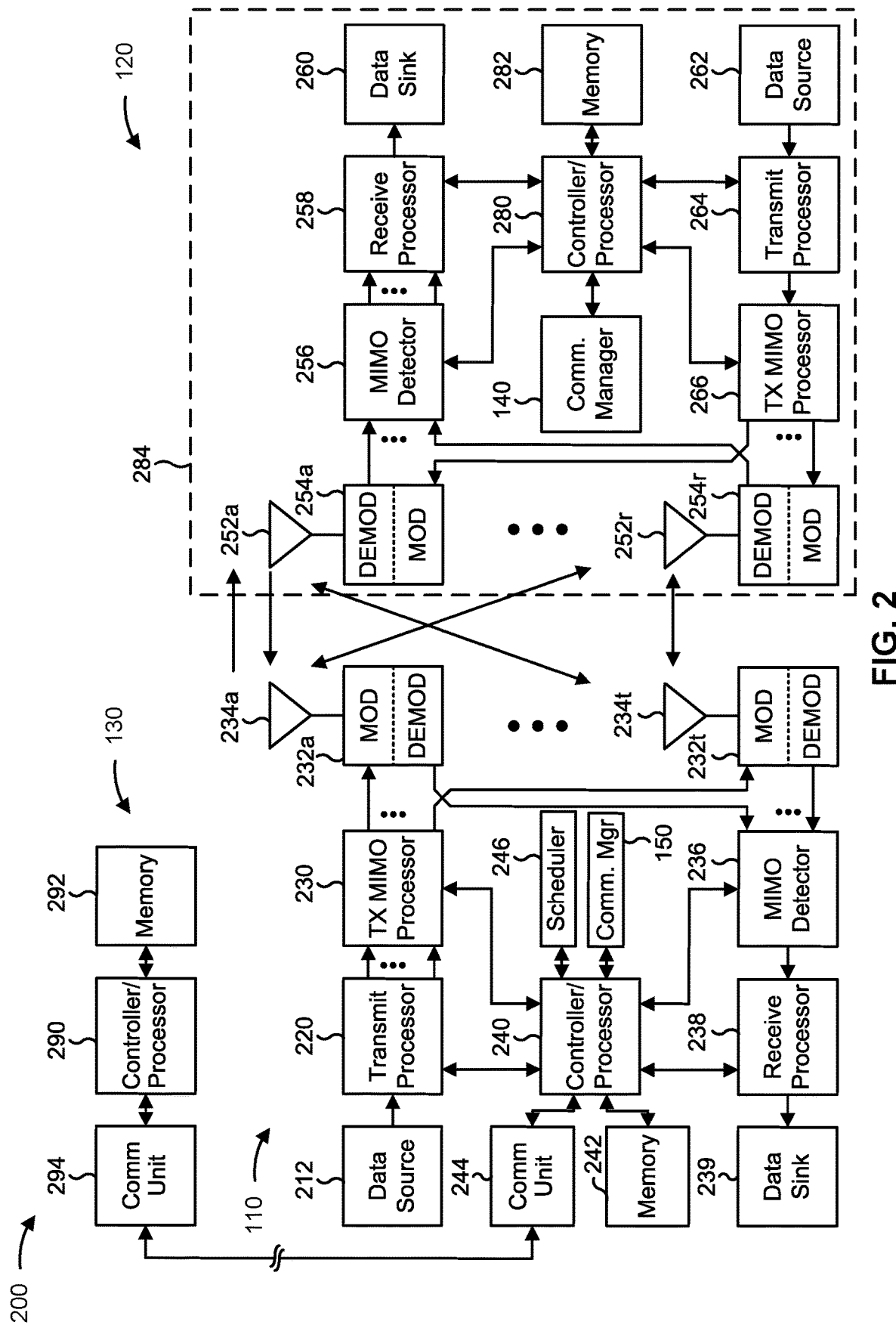
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (Tx) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a Tx MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the Tx MIMO processor 266. The transceiver may be used by a processor (e.g., the controller/processor 280) and the memory 282 to perform aspects of any of the methods described herein (e.g., with reference to FIGS. 5-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the Tx MIMO processor 230. The transceiver may be used by a processor (e.g., the controller/processor 240) and the memory 242 to perform aspects of any of the methods described herein (e.g., with reference to FIGS. 5-11).

The controller/processor 240 of the network node 110, the controller/processor 280 of the UE 120, and/or any other component(s) of FIG. 2 may perform one or more techniques associated with beam management using multiple sets of CSI-RSs and CQI reporting, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, during a beam management procedure, multiple sets of CSI-RSs, wherein each set of CSI-RSs is associated with a same network node transmit beam; means for receiving multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs; and/or means for transmitting multiple CQI reports based at least in part on the multiple CSI-RSs, wherein one CQI report of the multiple CQI reports is based at least in part on the one CSI-RS of the multiple CSI-RSs. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for transmitting, during a beam management procedure, multiple sets of CSI-RSs, wherein each set of CSI-RSs is associated with a same network node transmit beam; means for transmitting multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs; and/or means for receiving multiple CQI reports based at least in part on the multiple CSI-RSs, wherein one CQI report of the multiple CQI reports is based at least in part on the one CSI-RS of the multiple CSI-RSs. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the Tx MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
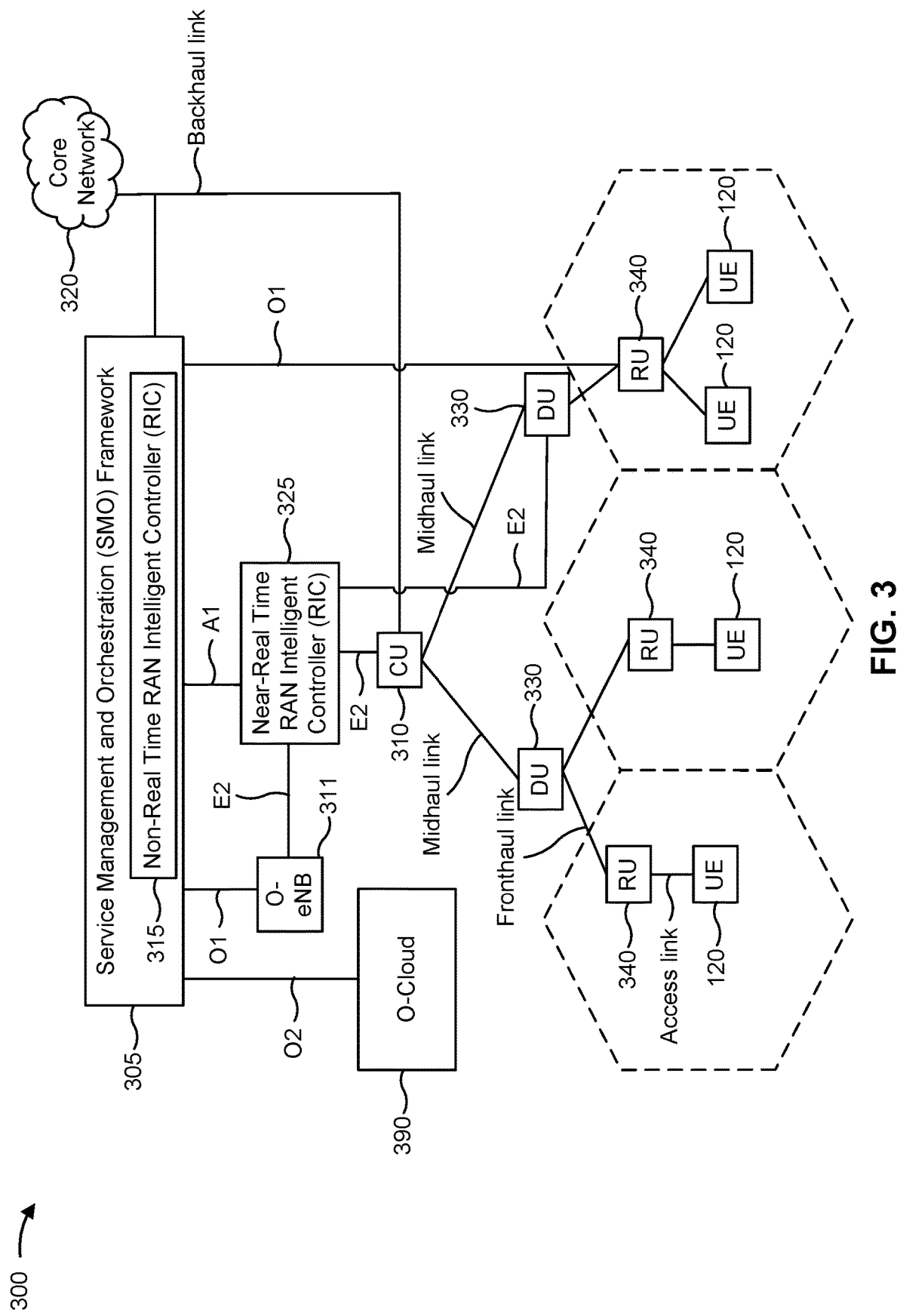
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
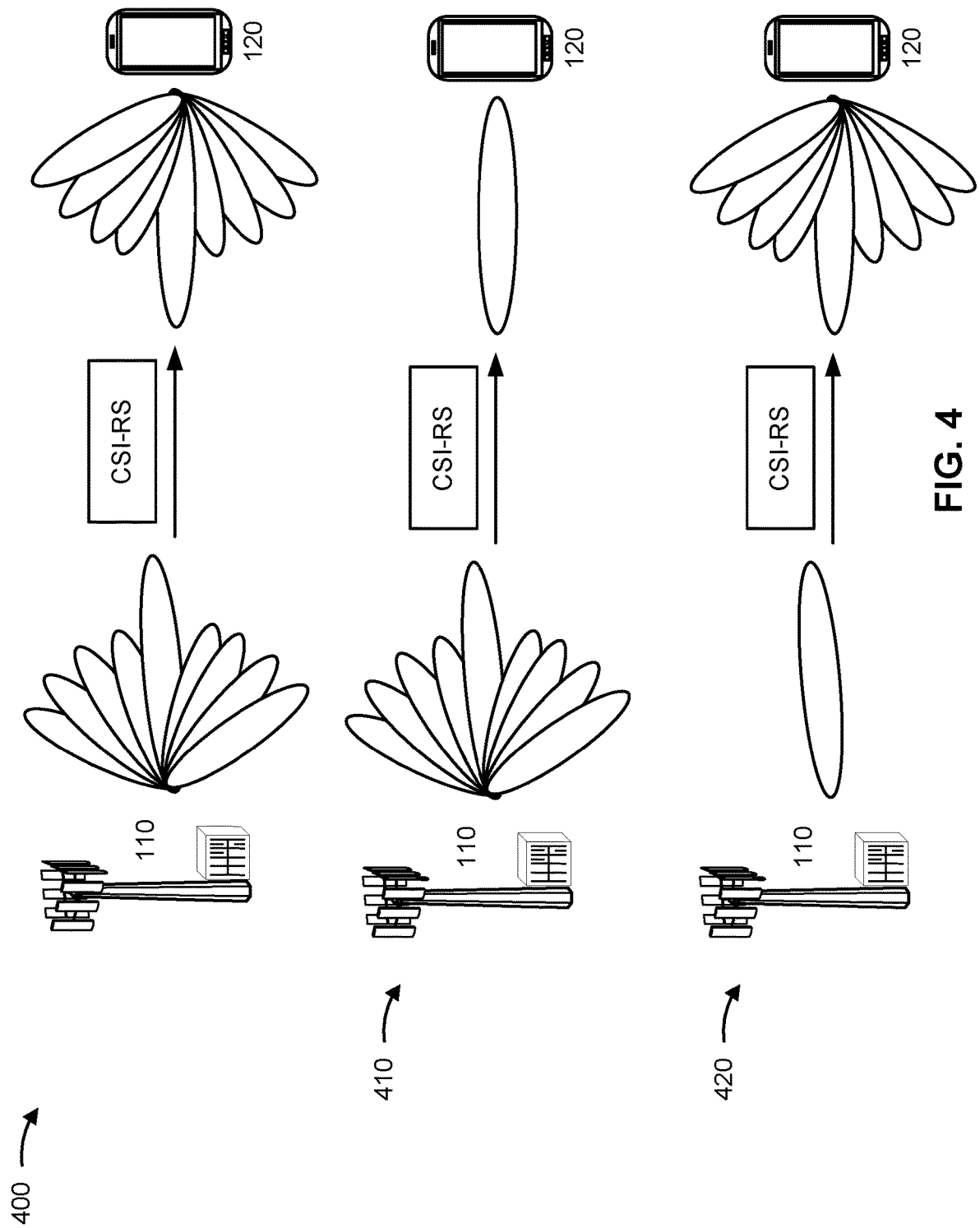
FIG. 4 is a diagram illustrating examples of channel state information reference signal (CSI-RS) beam management procedures, in accordance with the present disclosure.

FIG. 4 is a diagram illustrating examples 400, 410, and 420 of channel state information reference signal (CSI-RS) beam management procedures, in accordance with the present disclosure. As shown in FIG. 4, examples 400, 410, and 420 include a UE 120 in communication with a network node 110 in a wireless network (e.g., wireless network 100). However, the devices shown in FIG. 4 are provided as examples, and the wireless network may support communication and beam management between other devices (e.g., between a UE 120 and a network node 110 or TRP, between a mobile termination node and a control node, between an IAB child node and an IAB parent node, and/or between a scheduled node and a scheduling node). In some aspects, the UE 120 and the network node 110 may be in a connected state (e.g., an RRC connected state).

As shown in FIG. 4, example 400 may include a network node 110 (e.g., one or more network node devices such as an RU, a DU, and/or a CU, among other examples) and a UE 120 communicating to perform beam management using CSI-RSs. Example 400 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 4 and example 400, CSI-RSs may be configured to be transmitted from the network node 110 to the UE 120. The CSI-RSs may be configured to be periodic (e.g., using RRC signaling).

The first beam management procedure may include the network node 110 performing beam sweeping over multiple Tx beams. The network node 110 may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same RS resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. While example 400 has been described in connection with CSI-RSs, the first beam management process may also use synchronization signal blocks (SSBs) for beam management in a similar manner as described above.

As shown in FIG. 4, example 410 may include a network node 110 and a UE 120 communicating to perform beam management using CSI-RSs. Example 410 depicts a second beam management procedure (e.g., P2 CSI-RS beam management). The second beam management procedure may be referred to as a beam refinement procedure, a network node beam refinement procedure, a TRP beam refinement procedure, and/or a transmit beam refinement procedure. As shown in FIG. 4 and example 410, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 4, example 420 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 4 and example 420, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

As indicated above, FIG. 4 is provided as an example of beam management procedures. Other examples of beam management procedures may differ from what is described with respect to FIG. 4. For example, the UE 120 and the network node 110 may perform the third beam management procedure before performing the second beam management procedure, and/or the UE 120 and the network node 110 may perform a similar beam management procedure to select a UE transmit beam.

A mmWave propagation may be different from a sub-6 GHz propagation. The mmWave propagation may be associated with a higher pathloss as compared to the sub-6 GHz propagation. The mmWave propagation may be associated with new types of mobility introduced by UE translational/rotational motions, as compared to the sub-6 GHz propagation. The mmWave propagation may be associated with cluster jumps and blockers, as compared to the sub-6 GHz propagation. Due to such differences, beam management may be needed for mmWave systems. The beam management may involve beamforming to overcome relatively large pathloss. The beam management may involve establishing and maintaining a beam pair link (BPL) between a UE and a network node. The beam management may involve mobility management.

Beam management may involve a P1 procedure, a P2 procedure, and a P3 procedure. The P1 procedure may involve establishing an initial BPL between the UE and the network node. The P2 procedure may involve a network node beam refinement. The P3 procedure may involve a UE beam refinement. The network node may be associated with refined beams in accordance with: gNB[i], i=1, 2, . . . , K. The UE may be associated with beams in accordance with: UEb[j], j=1, 2, . . . , L.

In a typical beam management, during the P1 procedure, the network node may determine a suitable beam pair, which may include a network node Tx beam (e.g., a gNB Tx beam) and a UE Rx beam. The P1 procedure may be an SSB-based procedure or a CSI-RS-based procedure. During the P1 procedure, the UE may report, to the network node, a best network node beam.

During the P2 procedure, the network node may transmit a set of CSI-RSs, using one or two ports, and using different network node Tx beams. The UE Rx beam may be fixed when different CSI-RSs have the same quasi-co-location (QCL) source, or the UE Rx beam may vary when different CSI-RSs have different QCL sources. The P2 procedure may be associated with a network node beam refinement. During the P2 procedure, the network node may select a best network node beam based at least in part on a measurement reporting from the UE. The best network node beam and UE beam pair may be denoted by (gNB[i], UEb[j]). The network node may select the best network node beam, which may be based at least in part on the best UE beam acquired from the P1 procedure.

During the P3 procedure, the network node may transmit a set of CSI-RSs, using one or two ports, and using the same network node Tx beam. The network node Tx beam may be fixed. The P3 procedure may be associated with a UE beam refinement. During the P3 procedure, the network node may transmit a sequence of CSI-RSs using the same network node Tx beam, where the same network node Tx beam may be based at least in part on a selected refined beam (e.g., the best network node beam from the P2 procedure). The UE may train its Rx beam using the P3 procedure. A best UE beam for gNB[i] may be denoted by UEb[j 1].

In some cases, a selected beam pair (gNB[i], UEb[j 1]) may not globally be the best among a plurality of network node and UE beam pairs, which may be denoted by (gNB[i], UEb[j]), i=1, . . . , K, j=1, . . . , L. Some beam pairs may be better than the selected beam pair, but the network node and/or the UE may not have a mechanism for identifying such beam pairs. Further, the network node beam refinement may primarily be determined at the network node, and the UE beam refinement may primarily be determined at the UE, which may cause the selected beam pair to not necessarily be the best among the plurality of network node and UE beam pairs.

The 3GPP Technical Specification (TS) does not rigidly define P1, P2, and P3 beam management procedures for the UE and the network node. The 3GPP TS does not constrain the ordering or number of P2 and P3 sessions for a given SSB measurement timing configuration (SMTC), and does not preclude the existence of a joint P2/P3 session. In a typical P1, P2, and P3 procedure, in the P1 procedure, the network node may broadcast reference signals using a coarse beam codebook, and then the UE may perform an autonomous beam scan and refinement to establish the initial BPL. In the P2 procedure, the network node may offer a subset of a refined beam codebook. The UE may measure these network node beams with its UE beam selected from the P1 procedure. The network node may then select its best P2 beam based at least in part on a UE report. In the P3 procedure, the network node may transmit the selected P2 refined beam multiple times, such that the UE may further refine its beam. P3 sessions typically follow P3 sessions in a sequential fashion. The BPL obtained from the typical P1, P2, and P3 procedure may not be the optimal BPL. The sequential nature of the P2/P3 procedures may result in a local optimization, and in the P3 procedure, the UE does not have the opportunity to refine its beam against a plurality of beams (e.g., all beams) in a network node refined beam codebook.

In various aspects of techniques and apparatuses described herein, a UE may receive, from a network node and during a beam management procedure, multiple sets of CSI-RSs. Each set of CSI-RSs may be associated with a same network node transmit beam. The UE may receive the multiple sets of CSI-RSs during multiple P3 procedures of the beam management procedure. The UE may receive, from the network node, multiple CSI-RSs. One CSI-RS of the multiple CSI-RSs may be associated with one set of CSI-RSs of the multiple sets of CSI-RSs. A beam associated with the one CSI-RS may correspond to a beam associated with the one set of CSI-RSs. The UE may transmit, to the network node, multiple CQI reports based at least in part on the multiple CSI-RSs. One CQI report of the multiple CQI reports may be based at least in part on the one CSI-RS of the multiple CSI-RSs. The network node may select a best network node beam based at least in part on the multiple CQI reports. In some aspects, the multiple sets of CSI-RSs corresponding to the multiple P3 procedures, the multiple CSI-RSs, and the multiple CQI reports may allow for a joint beam management between the UE and the network node, which may increase a likelihood that a best beam pair is selected among a plurality of network node and UE beam pairs. Further, the network node may use CQI to select the network node beam, which may better match a downlink performance.

In some aspects, a joint P2-P3 network node and UE beam refinement may be achieved through multiple P3 sessions, where each P3 session may be followed with a CQI report through a CSI-RS (e.g., channel state information (CSI)) that has the same network node beam that is utilized in the P3 session. The CQI may be filtered by either the UE or the network node. The network node may use the CQI to determine the best network node beam, and the network node may indicate the best network node beam to the UE via a beam indication signaling. The UE may select the best UE beam based at least in part on the indicated best network node beam. In some aspects, the UE beam refinement in the P3 procedure may be based at least in part on the top beams in the P2 report, or may be determined adaptively around a current network node serving beam without the P2 report. The P2 and P3 reference signals may be associated with one port (1-port) or two ports (2-port). The UE may determine the best UE beam for the P3 procedure based at least in part on an RSRP, a signal-to-interference-plus-noise ratio (SINR), and/or a spectral efficiency. A P2 session frequency may not be constrained by a P3 session frequency. For example, fewer P2 sessions than P3 sessions may be used, or vice versa. In some cases, the P2 sessions may be skipped entirely. Further, the order of the P2 procedure, the P3 procedure, and the CSI-RSs (e.g., CSI) may be arbitrary. For example, multiple CSI-RSs (e.g., CSIs) may be employed per P3 session. As another example, multiple P3 sessions may be employed per P2 session. As a result, an approximately global joint optimization of network node and UE BPLs may be allowed. Further, the use of CQI to select the network node beam may be allowed, which may improve a downlink performance.

Figure 5:
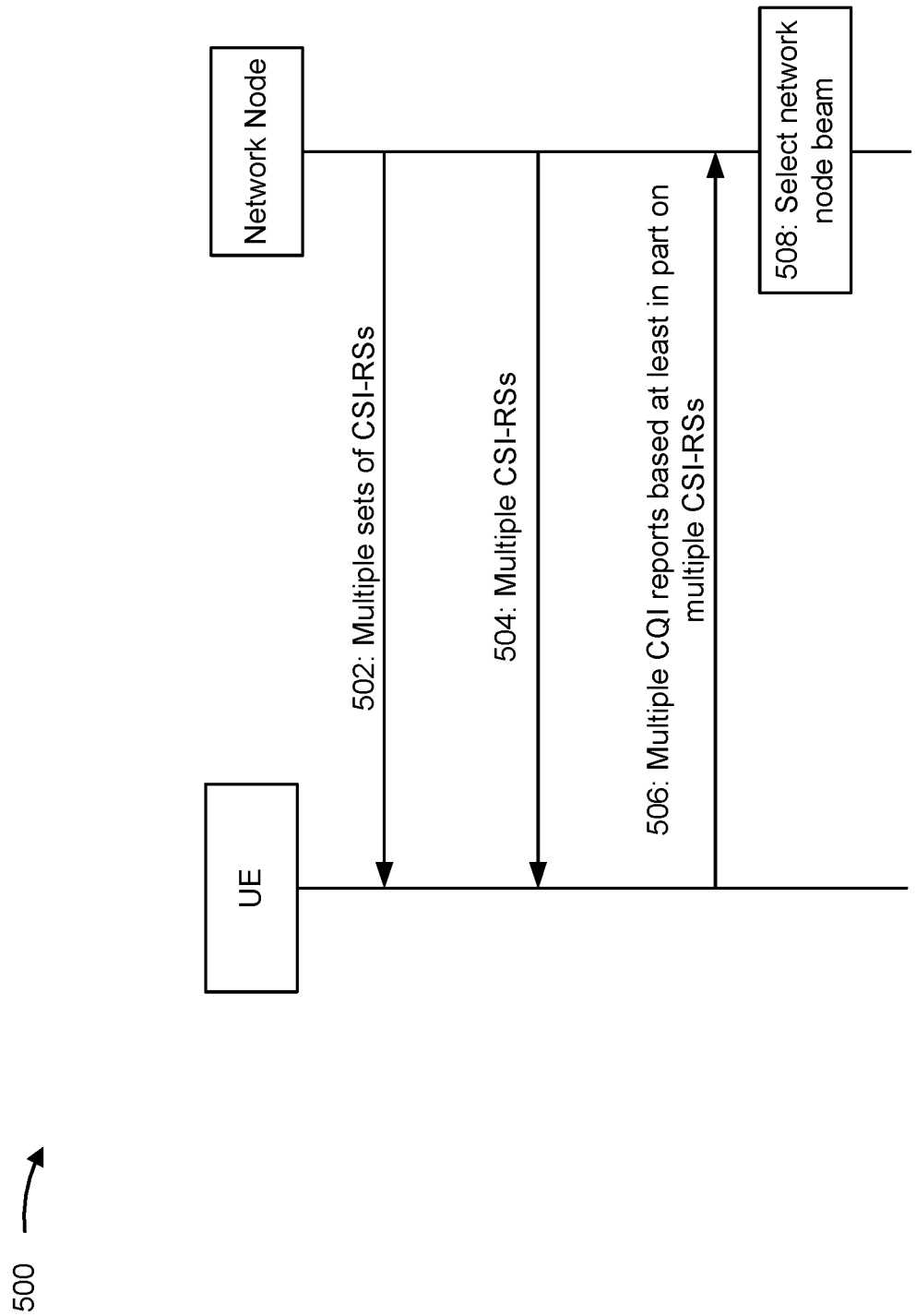
FIGS. 5-7 are diagrams illustrating examples associated with beam management using multiple sets of CSI-RSs and channel quality indicator (CQI) reporting, in accordance with the present disclosure.

FIG. 5 is a diagram illustrating an example 500 associated with beam management using multiple sets of CSI-RSs and CQI reporting, in accordance with the present disclosure. As shown in FIG. 5, example 500 includes communication between a UE (e.g., UE 120) and a network node (e.g., network node 110). In some aspects, the UE and the network node may be included in a wireless network, such as wireless network 100.

As shown by reference number 502, the UE may receive, from the network node and during a beam management procedure, multiple sets of CSI-RSs. Each set of CSI-RSs may be associated with a same network node transmit beam (e.g., a same gNB transmit beam). The multiple sets of CSI-RSs may be associated with multiple P3 procedures of the beam management procedure. For example, during each P3 procedure, the UE may receive a set of CSI-RSs from the network node. In other words, during the same beam management procedure, the UE may receive the multiple sets of CSI-RSs, where each set of CSI-RSs may be associated with one P3 procedure of the multiple P3 procedures.

As shown by reference number 504, the UE may receive, from the network node, multiple CSI-RSs. One CSI-RS of the multiple CSI-RSs may be associated with one set of CSI-RSs of the multiple sets of CSI-RSs. A beam associated with the one CSI-RS may correspond to a beam associated with the one set of CSI-RSs. In other words, the network node may transmit the CSI-RS to the UE, and the same beam used to transmit the set of CSI-RSs may be used to transmit the CSI-RS. The UE may receive the multiple CSI-RSs using multiple beams, which may be based at least in part on the UE beam selection during the multiple P3 procedures.

As an example, the network node may transmit, during a first P3 procedure, a first set of CSI-RSs. The network node may transmit, a first CSI-RS using the same beam as that of the first set of CSI-RS. The network node may transmit, during a second P3 procedure, a second set of CSI-RSs. The network node may transmit, a second CSI-RS using the same beam as that of the second set of CSI-RS. The network node may transmit, during a third P3 procedure, a third set of CSI-RSs. The network node may transmit, a third CSI-RS using the same beam as that of the third set of CSI-RS.

As shown by reference number 506, the UE may transmit, to the network node, multiple CQI reports based at least in part on the multiple CSI-RSs. One CQI report of the multiple CQI reports may be based at least in part on the one CSI-RS of the multiple CSI-RSs. In other words, a particular CQI report may correspond to a particular CSI-RS received from the network node.

In some aspects, each CQI report may be for a single CSI-RS, were the single CSI-RS may be based at least in part on a set of CSI-RSs (e.g., P3 procedure). In other words, each P3 procedure may be associated with a set of CSI-RSs. Each CSI-RS that follows the P3 procedure may be a single CSI-RS. Each CQI report may be for the single CSI-RS.

As shown by reference number 508, the network node may select a best network node beam based at least in part on the multiple CQI reports. In other words, the best network node beam may be based at least in part on the multiple CQI reports. The network node may select the best network node beam after receiving the multiple CQI reports from the multiple CSI-RSs, where the multiple CSI-RSs may be associated with different refined beams.

In some aspects, an ordering associated with the multiple sets of CSI-RSs, the multiple CSI-RSs, and the multiple CQI reports may be based at least in part on a predefined ordering scheme. For example, the predefined ordering scheme may involve an ordering of a single set of CSI-RSs, followed by a single CSI-RS, and followed by a single CQI report. Alternatively, the predefined ordering scheme may involve an ordering of consecutive sets of CSI-RSs, followed by a single CSI-RS, and followed by a single CQI report.

In some aspects, prior to the multiple sets of CSI-RSs being received, the UE may receive an SSB from the network node. The UE may receive the SSB during a P1 procedure of the beam management procedure. In some aspects, prior to the multiple sets of CSI-RSs being received, the UE may receive, from the network node, a plurality of CSI-RSs associated with a P2 procedure of the beam management procedure. The plurality of CSI-RSs may be associated with different beams. The UE may transmit, to the network node, a measurement report (e.g., a P2 measurement report) indicating top beams. The measurement report may be a layer 1 (L1) measurement report. After the UE transmits the measurement report, the UE may receive the multiple sets of CSI-RSs and the multiple CSI-RSs from the network node.

In some aspects, a quantity associated with the top beams may correspond to a quantity associated with the multiple sets of CSI-RSs. For example, when the UE reports three top beams to the network node, the UE may receive three sets of CSI-RSs from the network node. Further, the UE may receive three CSI-RSs from the network node, which may be based at least in part on the three sets of CSI-RSs, respectively. Further, the UE may transmit three CQI reports to the network node, which may be based at least in part on the three CSI-RSs, respectively.

In some aspects, the UE may receive, from the network node and after the multiple CQI reports are transmitted, a beam switch indication. For example, the UE may receive, from the network node, a MAC-CE that indicates the beam switch indication. The beam switch indication may cause the UE to switch to another beam, which may be based at least in part on the multiple CQI reports. In some aspects, the multiple sets of CSI-RSs, the multiple CSI-RSs, and the multiple CQI reports may enable a joint network node and UE beam refinement (e.g., an approximately global joint optimization of a network node and UE beam refinement). Further, the multiple CQI reports may be used for selection of a network node beam, which may enable the network node to better match a downlink performance.

In some aspects, during the P2 procedure, the UE may report up to X top beams to the network node (e.g., top X network node beams). For example, the UE may report the top four measurements (e.g., RSRP measurements and/or SINR measurements) associated with a resource set during the P2 procedure. Each of the top four measurements may be associated with a certain beam. After receiving an indication of the X top beams, the network node may perform a P3 procedure for each of the X top beams or for a portion of the X top beams. For example, when the UE reports four top beams during the P2 procedure, the network node may perform up to four P3 procedures, where one P3 procedure may be for each reported beam. The UE may use an RSRP measurement or a spectral efficiency to select a best UE beam from the P3 procedure. In some aspects, each P3 procedure may be followed with a CSI-RS using the same best UE beam, which may allow the UE to transmit a CQI report based at least in part on the CSI-RS that uses the best UE beam. The UE may report the quality of the best UE beam by effectively using CQI as the metric, where the CQI may be derived based at least in part on the spectral efficiency. After receiving the CQI from multiple CSI-RSs of different refined beams, the network node may select the best network node refined beam using CQI as the metric. In some cases, the order of different P3 procedures and CSI-RSs may be arbitrary.

In some aspects, in a joint P2/P3 beam management, each P2 report provided by the UE may contain the top X network node beams. After receiving the top X network node beams, the network node may grant a P3 session for each P2 beam or a subset of P2 beams. For example, the network node may allocate up to four P3 sessions, where each P3 session may be for each reported P2 beam. The network node may choose to down select the P2 beams from a codebook adaptively based at least in part on other peripheral information, such as codebook structure. For example, the network node may employ a set tracking algorithm, in which the network node may choose the candidate P2 beams around the current P2 serving beam. For each P3 session, the UE may scan a subset of its codebook to further refine its own beam. The UE may use either spectral efficiency or RSRP as a beam selection metric. Each P3 session may be followed by a CSI-RS (e.g., CSI) using the same network node beam utilized in the previous P3 session to allow the UE to perform a CSI report, which may effectively allow the UE to report the quality of the selected network node and UE BPL using CQI as a metric, and where the CQI may be derived based at least in part on the spectral efficiency. After receiving multiple CQI reports from the UE, the network node may select the best P2 beam using the CQI as the metric. With the help of the P2 beam indication, the order of P3/CSI-RS sessions may be arbitrary.

As indicated above, FIG. 5 is provided as an example. Other examples may differ from what is described with regard to FIG. 5.

Figure 6:
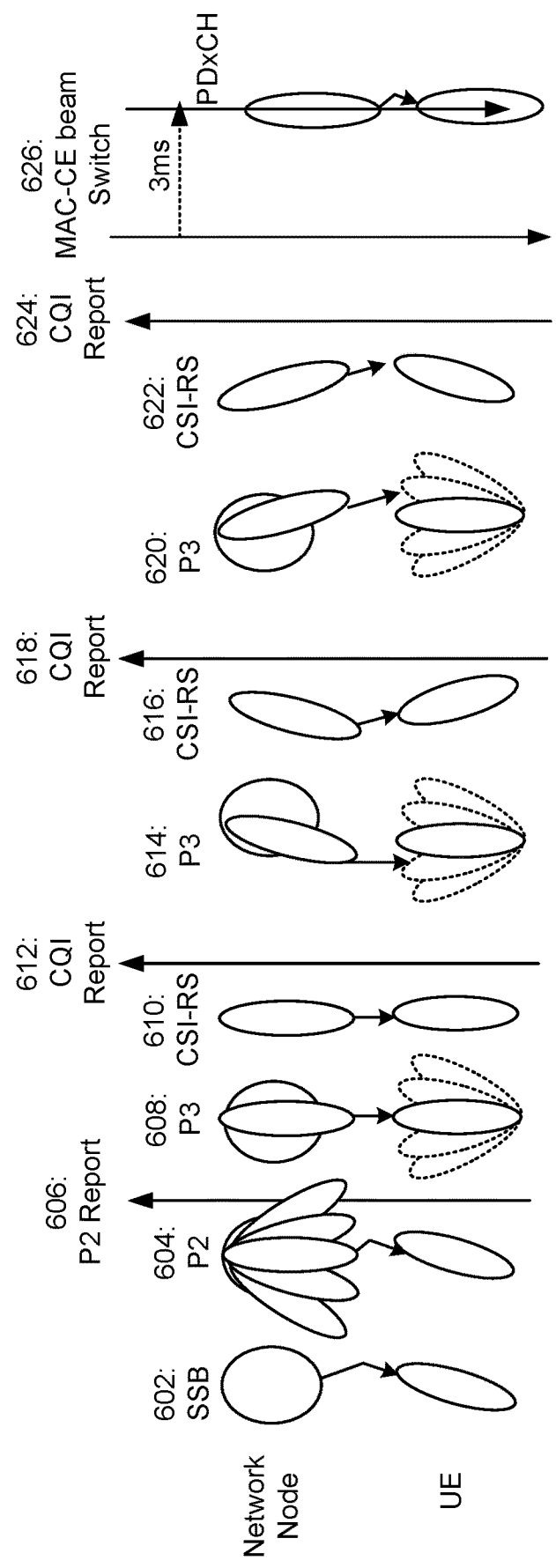

FIG. 6 is a diagram illustrating an example 600 associated with beam management using multiple sets of CSI-RSs and CQI reporting, in accordance with the present disclosure.

As shown by reference number 602, a network node may transmit, to a UE, an SSB during a P1 procedure of a beam management procedure. As shown by reference number 604, the network node may transmit, to the UE, a plurality of CSI-RSs during a P2 procedure of the beam management procedure. The plurality of CSI-RSs may be associated with different beams. As shown by reference number 606, the UE may transmit, to the network node, a measurement report (e.g., a P2 report), which may be based at least in part on measurements associated with the plurality of CSI-RSs.

As shown by reference number 608, the network node may transmit, to the UE, a first set of CSI-RSs using the same beam during a first P3 procedure of the beam management procedure. As shown by reference number 610, the network node may transmit, to the UE, a first CSI-RS using the same beam as used to transmit the first set of CSI-RSs. As shown by reference number 612, the network node may receive, from the UE, a first CQI report, which may be based at least in part on the first CSI-RS.

As shown by reference number 614, the network node may transmit, to the UE, a second set of CSI-RSs using the same beam during a second P3 procedure of the beam management procedure. As shown by reference number 616, the network node may transmit, to the UE, a second CSI-RS using the same beam as used to transmit the second set of CSI-RSs. As shown by reference number 618, the network node may receive, from the UE, a second CQI report, which may be based at least in part on the second CSI-RS.

As shown by reference number 620, the network node may transmit, to the UE, a third set of CSI-RSs using the same beam during a third P3 procedure of the beam management procedure. As shown by reference number 622, the network node may transmit, to the UE, a third CSI-RS using the same beam as used to transmit the third set of CSI-RSs. As shown by reference number 624, the network node may receive, from the UE, a third CQI report, which may be based at least in part on the third CSI-RS.

In some aspects, beams may be different between the first P3 procedure, the second P3 procedure, and the third P3 procedure. Beams may be different between the first CSI-RS, the second CSI-RS, and the third CSI-RS. The first P3 procedure and the first CSI-RS may be associated with the same beams (e.g., first beams). The second P3 procedure and the second CSI-RS may be associated with the same beams (e.g., second beams). The third P3 procedure and the third CSI-RS may be associated with the same beams (e.g., third beams).

As shown by reference number 626, the network node may transmit, to the UE, a MAC-CE beam switch indication, which may be based at least in part on the first CQI report, the second CQI report, and the third CQI report. In other words, the network node may indicate a beam switching based at least in part on multiple CQI reports received from the UE. The network node may perform a downlink transmission, via a PDxCH, based at least in part on the beam switching. "PDxCH" may refer to a physical downlink shared channel (PDSCH) or a physical downlink control channel (PDCCH). The downlink transmission may occur after the beam switching (e.g., 3 ms after the beam switching).

In some aspects, in a joint P2-P3-CSI-RS for beam decision, the UE may transmit a P2 measurement/report to the network node, which may indicate up to four refined beams. The P2 procedure may be skipped when a number of refined beams under each SSB is less than four, or when the network node is otherwise able to limit the number of refined beams to be tracked. For example, the network node may choose to pick only the P2 beams that are neighbors of the current serving P2 beam. The P2 procedure may be allocated less frequently as compared to the P3 procedure, for example, when the UE is associated with low mobility. Multiple CSI-RS for beam management (e.g., during the P3 procedure) and CSI-RS for CSI pairs on the reported refined beams may be transmitted for a global optimization of beam selection. The CSI-RS for CSI may be associated with CQI reporting. Resources for multiple sets of CSI-RSs (associated with the P3 procedures) may be distributed across frames to save resources. In other words, P3/CSI-RS resources may be either back-to-back for quick turnaround or distributed across frames to save resources. The network node may use CQI reports to determine which beam is best (e.g., which network node beam is best), and the network node may perform a downlink transmission using the selected beam.

As indicated above, FIG. 6 is provided as an example. Other examples may differ from what is described with regard to FIG. 6.

Figure 7:
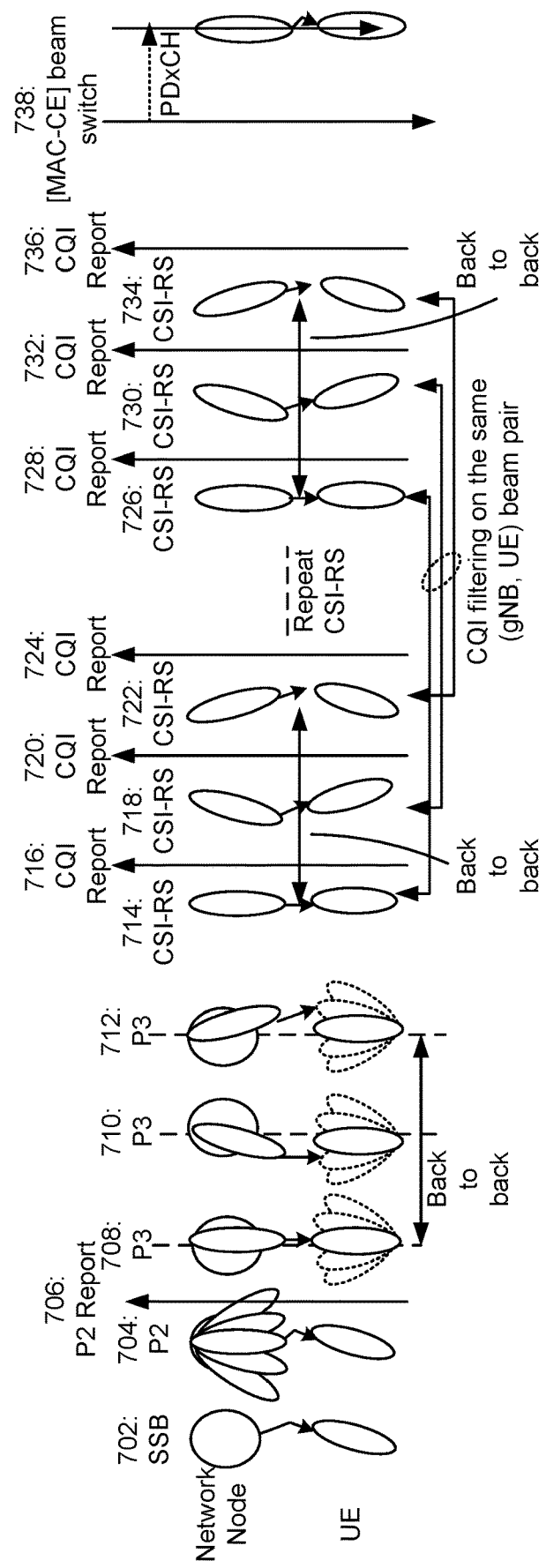

FIG. 7 is a diagram illustrating an example 700 associated with beam management using multiple sets of CSI-RSs and CQI reporting, in accordance with the present disclosure.

As shown by reference number 702, a network node may transmit, to a UE, an SSB during a P1 procedure of a beam management procedure. As shown by reference number 704, the network node may transmit, to the UE, a plurality of CSI-RSs during a P2 procedure of the beam management procedure. The plurality of CSI-RSs may be associated with different beams. As shown by reference number 706, the UE may transmit, to the network node, a measurement report (e.g., a P2 report), which may be based at least in part on measurements associated with the plurality of CSI-RSs.

As shown by reference number 708, the network node may transmit, to the UE, a first set of CSI-RSs using the same beam during a first P3 procedure of the beam management procedure. As shown by reference number 710, the network node may transmit, to the UE, a second set of CSI-RSs using the same beam during a second P3 procedure of the beam management procedure. As shown by reference number 712, the network node may transmit, to the UE, a third set of CSI-RSs using the same beam during a third P3 procedure of the beam management procedure. The network node may transmit the first set of CSI-RSs, the second set of CSI-RSs, and the third set of CSI-RSs in a back-to-back or consecutive manner.

As shown by reference number 714, the network node may transmit, to the UE, a first CSI-RS using the same beam as used to transmit the first set of CSI-RSs. As shown by reference number 716, the network node may receive, from the UE, a first CQI report, which may be based at least in part on the first CSI-RS. As shown by reference number 718, the network node may transmit, to the UE, a second CSI-RS using the same beam as used to transmit the second set of CSI-RSs. As shown by reference number 720, the network node may receive, from the UE, a second CQI report, which may be based at least in part on the second CSI-RS. As shown by reference number 722, the network node may transmit, to the UE, a third CSI-RS using the same beam as used to transmit the third set of CSI-RSs. As shown by reference number 724, the network node may receive, from the UE, a third CQI report, which may be based at least in part on the third CSI-RS.

In some aspects, the network node may repeat CSI-RS transmissions to the UE, and the network node may receive additional CQI reports based at least in part on the repeated CSI-RS transmissions. As shown by reference number 726, the network node may transmit, to the UE, a repetition of the first CSI-RS. As shown by reference number 728, the network node may receive, from the UE, an additional CQI report, which may be based at least in part on the repetition of the first CSI-RS. As shown by reference number 730, the network node may transmit, to the UE, a repetition of the second CSI-RS. As shown by reference number 732, the network node may receive, from the UE, an additional CQI report, which may be based at least in part on the repetition of the second CSI-RS. As shown by reference number 734, the network node may transmit, to the UE, a repetition of the third CSI-RS. As shown by reference number 736, the network node may receive, from the UE, an additional CQI report, which may be based at least in part on the repetition of the third CSI-RS. In some aspects, the network node may transmit repetitions of CSI-RSs using the same beams that were previously used for transmitting the CSI-RSs, respectively.

As shown by reference number 738, the network node may transmit, to the UE, a MAC-CE beam switch indication, which may be based at least in part on the first CQI report, the second CQI report, and the third CQI report. In other words, the network node may indicate a beam switching based at least in part on multiple CQI reports received from the UE. The network node may perform a downlink transmission, via a PDxCH, based at least in part on the beam switching.

In some aspects, resources for multiple sets of CSI-RSs (associated with the P3 procedures) may be back-to-back to enable a quick turnaround. In other words, the multiple sets of CSI-RSs (associated with the P3 procedures) for different refined beams may be transmitted to the UE in a back-to-back manner. In some aspects, the multiple sets of CSI-RSs may be transmitted back-to-back, and may be followed by respective CSI-RSs, which may also be transmitted back-to-back. In some aspects, for each candidate refined beam associated with a P3 procedure, the network node may transmit multiple CSI-RSs to the UE. The multiple CSI-RSs may include repeated CSI-RSs. In some aspects, the UE may perform a filtering on the CQI over the same pair of network node and UE beams before performing a CQI reporting. For example, the UE may transmit filtered CQI to the network node for each CSI-RS of CSI type. In some cases, the network node may perform a filtering on reported CQIs before selecting a network node refined beam, where the filtering may be on the reported CQIs of the same network node transmit beam.

As indicated above, FIG. 7 is provided as an example. Other examples may differ from what is described with regard to FIG. 7.

Figure 8:
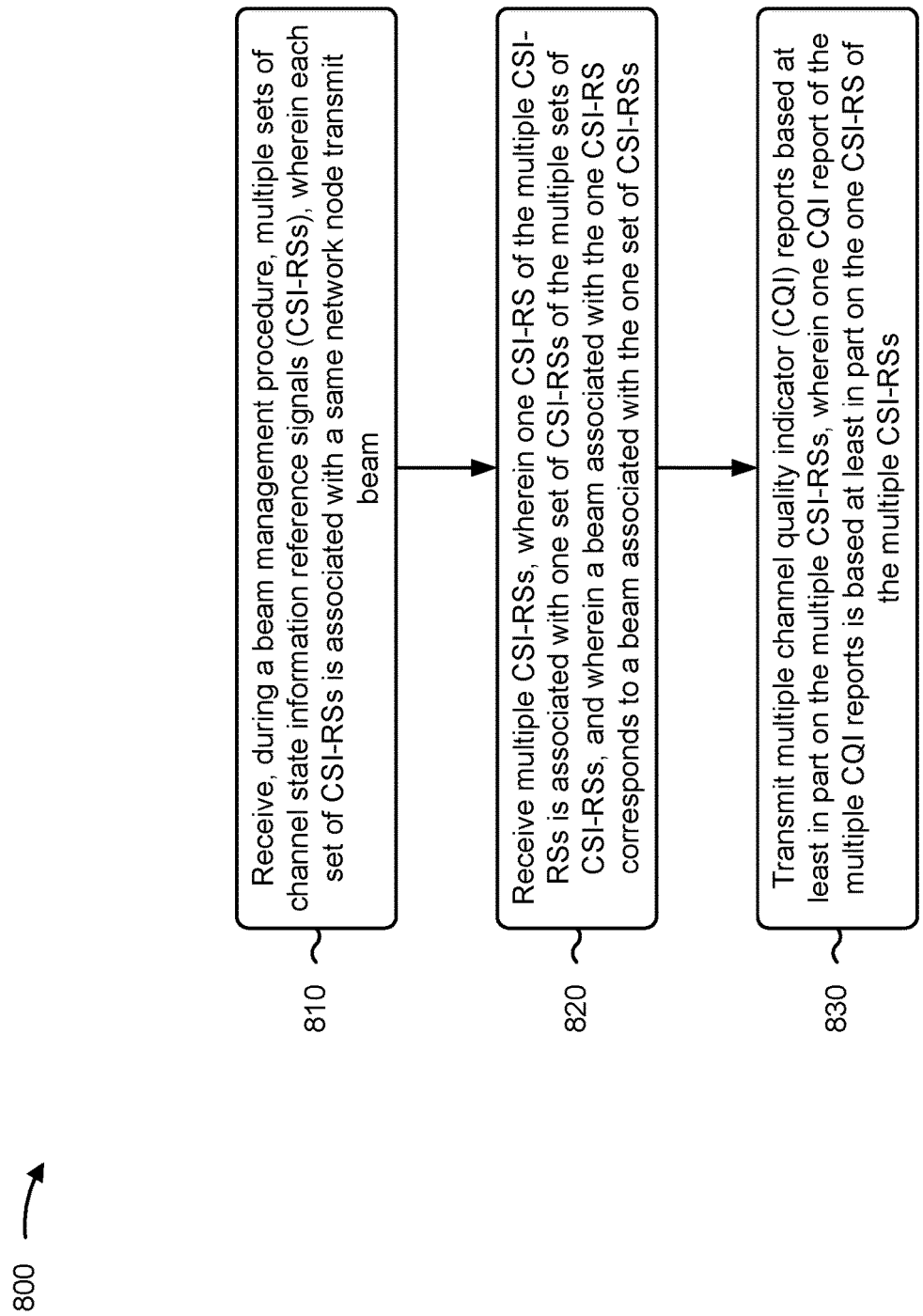
FIGS. 8-9 are diagrams illustrating example processes associated with beam management using multiple sets of CSI-RSs and CQI reporting, in accordance with the present disclosure.

FIG. 8 is a diagram illustrating an example process 800 performed, for example, by a UE, in accordance with the present disclosure. Example process 800 is an example where the UE (e.g., UE 120) performs operations associated with beam management using multiple sets of CSI-RSs and CQI reporting.

As shown in FIG. 8, in some aspects, process 800 may include receiving, during a beam management procedure, multiple sets of CSI-RSs, wherein each set of CSI-RSs is associated with a same network node transmit beam (block 810). For example, the UE (e.g., using reception component 1002, depicted in FIG. 10) may receive, during a beam management procedure, multiple sets of CSI-RSs, wherein each set of CSI-RSs is associated with a same network node transmit beam, as described above.

As further shown in FIG. 8, in some aspects, process 800 may include receiving multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs (block 820). For example, the UE (e.g., using reception component 1002, depicted in FIG. 10) may receive multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs, as described above.

As further shown in FIG. 8, in some aspects, process 800 may include transmitting multiple CQI reports based at least in part on the multiple CSI-RSs, wherein one CQI report of the multiple CQI reports is based at least in part on the one CSI-RS of the multiple CSI-RSs (block 830). For example, the UE (e.g., using transmission component 1004, depicted in FIG. 10) may transmit multiple CQI reports based at least in part on the multiple CSI-RSs, wherein one CQI report of the multiple CQI reports is based at least in part on the one CSI-RS of the multiple CSI-RSs, as described above.

Process 800 may include additional aspects, such as any single aspect or any combination of aspects described below and/or in connection with one or more other processes described elsewhere herein.

In a first aspect, the multiple sets of CSI-RSs are associated with multiple P3 procedures of the beam management procedure.

In a second aspect, alone or in combination with the first aspect, a best network node beam is based at least in part on the multiple CQI reports.

In a third aspect, alone or in combination with one or more of the first and second aspects, an ordering associated with the multiple sets of CSI-RSs, the multiple CSI-RSs, and the multiple CQI reports is based at least in part on a predefined ordering scheme.

In a fourth aspect, alone or in combination with one or more of the first through third aspects, the predefined ordering scheme involves an ordering of a single set of CSI-RSs, followed by a single CSI-RS, and followed by a single CQI report.

In a fifth aspect, alone or in combination with one or more of the first through fourth aspects, the predefined ordering scheme involves an ordering of consecutive sets of CSI-RSs, followed by a single CSI-RS, and followed by a single CQI report.

In a sixth aspect, alone or in combination with one or more of the first through fifth aspects, process 800 includes receiving, prior to receiving the multiple sets of CSI-RSs, a plurality of CSI-RSs associated with a P2 procedure of the beam management procedure, and transmitting a P2 measurement report indicating top beams.

In a seventh aspect, alone or in combination with one or more of the first through sixth aspects, process 800 includes receiving, after the multiple CQI reports are transmitted, a beam switch indication.

In an eighth aspect, alone or in combination with one or more of the first through seventh aspects, the multiple sets of CSI-RSs, the multiple CSI-RSs, and the multiple CQI reports enable a joint network node and UE beam refinement.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
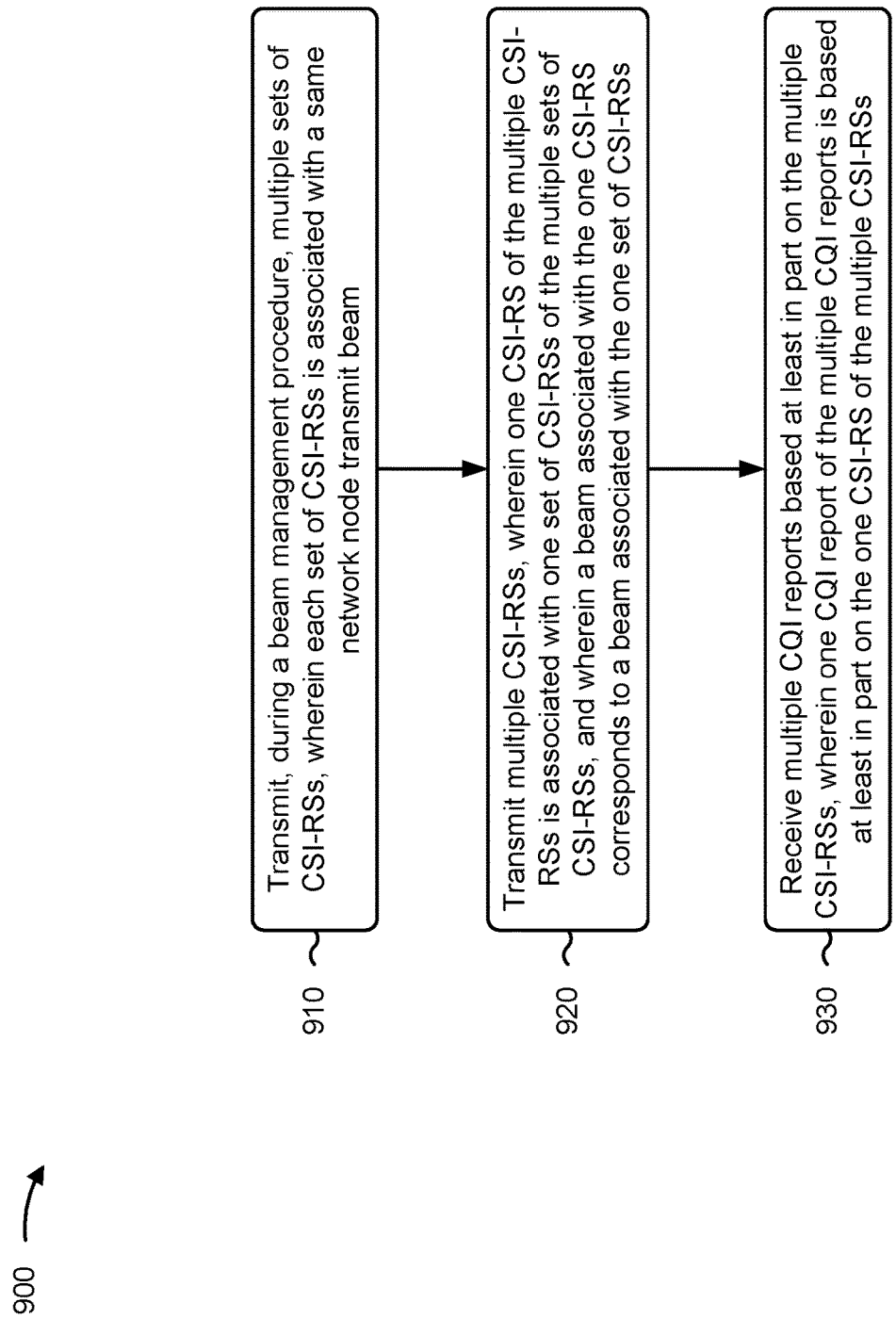

FIG. 9 is a diagram illustrating an example process 900 performed, for example, by a network node, in accordance with the present disclosure. Example process 900 is an example where the network node (e.g., network node 110) performs operations associated with beam management using multiple sets of CSI-RSs and CQI reporting.

As shown in FIG. 9, in some aspects, process 900 may include transmitting, during a beam management procedure, multiple sets of CSI-RSs, wherein each set of CSI-RSs is associated with a same network node transmit beam (block 910). For example, the network node (e.g., using transmission component 1104, depicted in FIG. 11) may transmit, during a beam management procedure, multiple sets of CSI-RSs, wherein each set of CSI-RSs is associated with a same network node transmit beam, as described above.

As further shown in FIG. 9, in some aspects, process 900 may include transmitting multiple CSI-RSs, wherein one CSI-RS of the multiple CSI-RSs is associated with one set of CSI-RSs of the multiple sets of CSI-RSs, and a beam associated with the one CSI-RS corresponds to a beam associated with the one set of CSI-RSs (block 920). For example, the network node (e.g., using transmission component 1104, depicted in FIG. 11) may transmit multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs, as described above.

As further shown in FIG. 9, in some aspects, process 900 may include receiving multiple CQI reports based at least in part on the multiple CSI-RSs, wherein one CQI report of the multiple CQI reports is based at least in part on the one CSI-RS of the multiple CSI-RSs (block 930). For example, the network node (e.g., using reception component 1102, depicted in FIG. 11) may receive multiple channel quality indicator (CQI) reports based at least in part on the multiple CSI-RSs, wherein one CQI report of the multiple CQI reports is based at least in part on the one CSI-RS of the multiple CSI-RSs, as described above.

Process 900 may include additional aspects, such as any single aspect or any combination of aspects described below and/or in connection with one or more other processes described elsewhere herein.

In a first aspect, the multiple sets of CSI-RSs are associated with multiple P3 procedures of the beam management procedure.

In a second aspect, alone or in combination with the first aspect, process 900 includes selecting a best network node beam based at least in part on the multiple CQI reports.

In a third aspect, alone or in combination with one or more of the first and second aspects, an ordering associated with the multiple sets of CSI-RSs, the multiple CSI-RSs, and the multiple CQI reports is based at least in part on a predefined ordering scheme.

In a fourth aspect, alone or in combination with one or more of the first through third aspects, process 900 includes transmitting, prior to transmitting the multiple sets of CSI-RSs, a plurality of CSI-RSs associated with a P2 procedure of the beam management procedure, and receiving a P2 measurement report indicating top beams.

In a fifth aspect, alone or in combination with one or more of the first through fourth aspects, process 900 includes transmitting, after the multiple CQI reports are received, a beam switch indication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
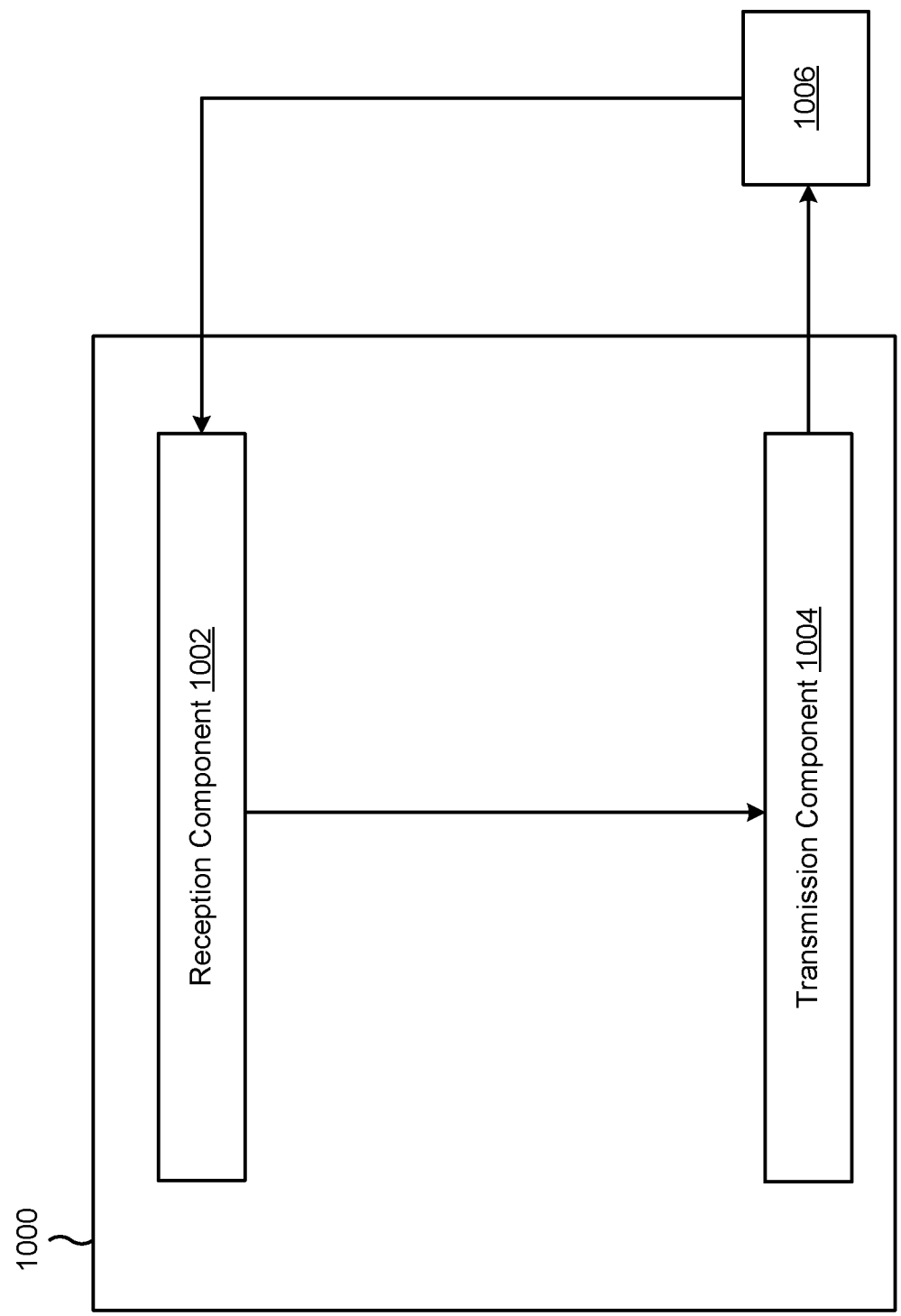
FIGS. 10-11 are diagrams of example apparatuses for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIGS. 5-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, during a beam management procedure, multiple sets of CSI-RSs, wherein each set of CSI-RSs is associated with a same network node transmit beam. The reception component 1002 may receive multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs. The transmission component 1004 may transmit multiple CQI reports based at least in part on the multiple CSI-RSs, wherein one CQI report of the multiple CQI reports is based at least in part on the one CSI-RS of the multiple CSI-RSs.

The reception component 1002 may receive, prior to receiving the multiple sets of CSI-RSs, a plurality of CSI-RSs associated with a P2 procedure of the beam management procedure. The transmission component 1004 may transmit a P2 measurement report indicating top beams. The reception component 1002 may receive, after the multiple CQI reports are transmitted, a beam switch indication.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
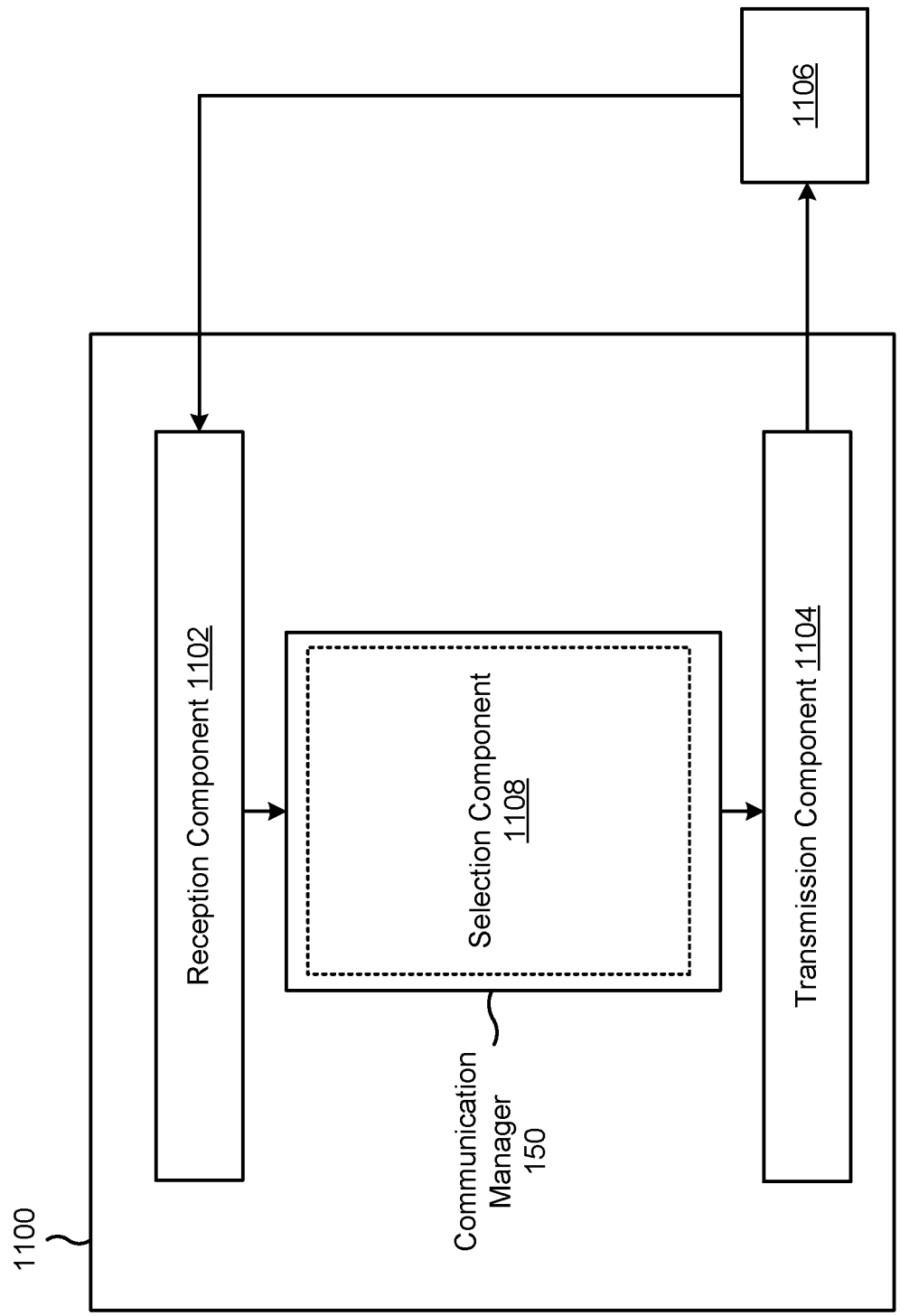

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a selection component 1108, among other examples.

In some aspects, the apparatus 1100 may be configured to perform one or more operations described herein in connection with FIGS. 5-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The transmission component 1104 may transmit, during a beam management procedure, multiple sets of CSI-RSs, wherein each set of CSI-RSs is associated with a same network node transmit beam. The transmission component 1104 may transmit multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs. The reception component 1102 may receive multiple CQI reports based at least in part on the multiple CSI-RSs, wherein one CQI report of the multiple CQI reports is based at least in part on the one CSI-RS of the multiple CSI-RSs.

The selection component 1108 may select a best network node beam based at least in part on the multiple CQI reports. The transmission component 1104 may transmit, prior to transmitting the multiple sets of CSI-RSs, a plurality of CSI-RSs associated with a P2 procedure of the beam management procedure. The reception component 1102 may receive a P2 measurement report indicating top beams. The transmission component 1104 may transmit, after the multiple CQI reports are received, a beam switch indication.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, during a beam management procedure, multiple sets of channel state information reference signals (CSI-RSs), wherein each set of CSI-RSs is associated with a same network node transmit beam; receiving multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs; and transmitting multiple channel quality indicator (CQI) reports based at least in part on the multiple CSI-RSs, wherein one CQI report of the multiple CQI reports is based at least in part on the one CSI-RS of the multiple CSI-RSs.

Aspect 2: The method of Aspect 1, wherein the multiple sets of CSI-RSs are associated with multiple procedure 3 (P3) procedures of the beam management procedure.

Aspect 3: The method of any of Aspects 1-2, wherein a best network node beam is based at least in part on the multiple CQI reports.

Aspect 4: The method of any of Aspects 1-3, wherein an ordering associated with the multiple sets of CSI-RSs, the multiple CSI-RSs, and the multiple CQI reports is based at least in part on a predefined ordering scheme.

Aspect 5: The method of Aspect 4, wherein the predefined ordering scheme involves an ordering of a single set of CSI-RSs, followed by a single CSI-RS, and followed by a single CQI report.

Aspect 6: The method of Aspect 4, wherein the predefined ordering scheme involves an ordering of consecutive sets of CSI-RSs, followed by a single CSI-RS, and followed by a single CQI report.

Aspect 7: The method of any of Aspects 1-6, further comprising: receiving, prior to receiving the multiple sets of CSI-RSs, a plurality of CSI-RSs associated with a procedure 2 (P2) procedure of the beam management procedure; and transmitting a P2 measurement report indicating top beams.

Aspect 8: The method of any of Aspects 1-7, further comprising: receiving, after the multiple CQI reports are transmitted, a beam switch indication.

Aspect 9: The method of any of Aspects 1-8, wherein the multiple sets of CSI-RSs, the multiple CSI-RSs, and the multiple CQI reports enable a joint network node and UE beam refinement.

Aspect 10: A method of wireless communication performed by a network node, comprising: transmitting, during a beam management procedure, multiple sets of channel state information reference signals (CSI-RSs), wherein each set of CSI-RSs is associated with a same network node transmit beam; transmitting multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs; and receiving multiple channel quality indicator (CQI) reports based at least in part on the multiple CSI-RSs, wherein one CQI report of the multiple CQI reports is based at least in part on the one CSI-RS of the multiple CSI-RSs.

Aspect 11: The method of Aspect 10, wherein the multiple sets of CSI-RSs are associated with multiple procedure 3 (P3) procedures of the beam management procedure.

Aspect 12: The method of any of Aspects 10-11, further comprising: selecting a best network node beam based at least in part on the multiple CQI reports.

Aspect 13: The method of any of Aspects 10-12, wherein an ordering associated with the multiple sets of CSI-RSs, the multiple CSI-RSs, and the multiple CQI reports is based at least in part on a predefined ordering scheme.

Aspect 14: The method of any of Aspects 10-13, further comprising: transmitting, prior to transmitting the multiple sets of CSI-RSs, a plurality of CSI-RSs associated with a procedure 2 (P2) procedure of the beam management procedure; and receiving a P2 measurement report indicating top beams.

Aspect 15: The method of any of Aspects 10-14, further comprising: transmitting, after the multiple CQI reports are received, a beam switch indication.

Aspect 16: An apparatus for wireless communication at a device, comprising a processor; memory coupled with the processor; and instructions stored in the memory and executable by the processor to cause the apparatus to perform the method of one or more of Aspects 1-9.

Aspect 17: A device for wireless communication, comprising a memory and one or more processors coupled to the memory, the one or more processors configured to perform the method of one or more of Aspects 1-9.

Aspect 18: An apparatus for wireless communication, comprising at least one means for performing the method of one or more of Aspects 1-9.

Aspect 19: A non-transitory computer-readable medium storing code for wireless communication, the code comprising instructions executable by a processor to perform the method of one or more of Aspects 1-9.

Aspect 20: A non-transitory computer-readable medium storing a set of instructions for wireless communication, the set of instructions comprising one or more instructions that, when executed by one or more processors of a device, cause the device to perform the method of one or more of Aspects 1-9.

Aspect 21: An apparatus for wireless communication at a device, comprising a processor; memory coupled with the processor; and instructions stored in the memory and executable by the processor to cause the apparatus to perform the method of one or more of Aspects 10-15.

Aspect 22: A device for wireless communication, comprising a memory and one or more processors coupled to the memory, the one or more processors configured to perform the method of one or more of Aspects 10-15.

Aspect 23: An apparatus for wireless communication, comprising at least one means for performing the method of one or more of Aspects 10-15.

Aspect 24: A non-transitory computer-readable medium storing code for wireless communication, the code comprising instructions executable by a processor to perform the method of one or more of Aspects 10-15.

Aspect 25: A non-transitory computer-readable medium storing a set of instructions for wireless communication, the set of instructions comprising one or more instructions that, when executed by one or more processors of a device, cause the device to perform the method of one or more of Aspects 10-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
receive, during one or more UE beam refinements, multiple sets of channel state information reference signals (CSI-RSs), wherein each set of CSI-RSs is associated with a same network node transmit beam associated with a network node beam refinement;
receive multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs; and
transmit multiple channel quality indicator (CQI) reports based at least in part on the multiple CSI-RSs, wherein one CQI report of the multiple CQI reports is based at least in part on the one CSI-RS of the multiple CSI-RSs.

2. The apparatus of claim 1,
wherein the multiple sets of CSI-RSs are associated with multiple procedure 3 (P3) procedures of the one or more UE beam refinements.

3. The apparatus of claim 1,
wherein a best network node beam is based at least in part on the multiple CQI reports.

4. The apparatus of claim 1,
wherein an ordering associated with the multiple sets of CSI-RSs, the multiple CSI-RSs, and the multiple CQI reports is based at least in part on a predefined ordering scheme.

5. The apparatus of claim 4,
wherein the predefined ordering scheme involves an ordering of a single set of CSI-RSs, followed by a single CSI-RS, and followed by a single CQI report.

6. The apparatus of claim 4,
wherein the predefined ordering scheme involves an ordering of consecutive sets of CSI-RSs, followed by a single CSI-RS, and followed by a single CQI report.

7. The apparatus of claim 1,
wherein the one or more processors are further configured to:
receive, prior to the multiple sets of CSI-RSs being received, a plurality of CSI-RSs associated with a procedure 2 (P2) procedure of the network node beam refinement; and
transmit a P2 measurement report indicating top beams.

8. The apparatus of claim 1,
wherein the one or more processors are further configured to:
receive, after the multiple CQI reports are transmitted, a beam switch indication.

9. The apparatus of claim 1,
wherein the multiple sets of CSI-RSs, the multiple CSI-RSs, and the multiple CQI reports enable a joint network node and UE beam refinement.

10. An apparatus for wireless communication at a network node, comprising:
one or more memories; and
one or more processors, coupled to the one or more memories, configured to:
transmit, during one or more user equipment (UE) beam refinements, multiple sets of channel state information reference signals (CSI-RSs), wherein each set of CSI-RSs is associated with a same network node transmit beam associated with a network node beam refinement;
transmit multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs; and receive multiple channel quality indicator (CQI) reports based at least in part on the multiple CSI-RSs, wherein one CQI report of the multiple CQI reports is based at least in part on the one CSI-RS of the multiple CSI-RSs.

11. The apparatus of claim 10, wherein the multiple sets of CSI-RSs are associated with multiple procedure 3 (P3) procedures of the one or more UE beam refinements.

12. The apparatus of claim 10, wherein the one or more processors are further configured to:
select a best network node beam based at least in part on the multiple CQI reports.

13. The apparatus of claim 10, wherein an ordering associated with the multiple sets of CSI-RSs, the multiple CSI-RSs, and the multiple CQI reports is based at least in part on a predefined ordering scheme.

14. The apparatus of claim 10, wherein the one or more processors are further configured to:
transmit, prior to transmitting the multiple sets of CSI-RSs, a plurality of CSI-RSs associated with a procedure 2 (P2) procedure of the network node beam refinement; and
receive a P2 measurement report indicating top beams.

15. The apparatus of claim 10, wherein the one or more processors are further configured to:
transmit, after the multiple CQI reports are received, a beam switch indication.

16. A method of wireless communication performed by a user equipment (UE), comprising:
receiving, during one or more UE beam refinements, multiple sets of channel state information reference signals (CSI-RSs), wherein each set of CSI-RSs is associated with a same network node transmit beam associated with a network node beam refinement;
receiving multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs; and
transmitting multiple channel quality indicator (CQI) reports based at least in part on the multiple CSI-RSs, wherein one CQI report of the multiple CQI reports is based at least in part on the one CSI-RS of the multiple CSI-RSs.

17. The method of claim 16, wherein the multiple sets of CSI-RSs are associated with multiple procedure 3 (P3) procedures of the one or more UE beam refinements.

18. The method of claim 16, wherein a best network node beam is based at least in part on the multiple CQI reports.

19. The method of claim 16, wherein an ordering associated with the multiple sets of CSI-RSs, the multiple CSI-RSs, and the multiple CQI reports is based at least in part on a predefined ordering scheme.

20. The method of claim 19, wherein the predefined ordering scheme involves an ordering of a single set of CSI-RSs, followed by a single CSI-RS, and followed by a single CQI report.

21. The method of claim 19, wherein the predefined ordering scheme involves an ordering of consecutive sets of CSI-RSs, followed by a single CSI-RS, and followed by a single CQI report.

22. The method of claim 16, further comprising:
receiving, prior to receiving the multiple sets of CSI-RSs, a plurality of CSI-RSs associated with a procedure 2 (P2) procedure of the network node beam refinement; and
transmitting a P2 measurement report indicating top beams.

23. The method of claim 16, further comprising:
receiving, after the multiple CQI reports are transmitted, a beam switch indication.

24. The method of claim 16, wherein the multiple sets of CSI-RSs, the multiple CSI-RSs, and the multiple CQI reports enable a joint network node and UE beam refinement.

25. A method of wireless communication performed by a network node, comprising:
transmitting, during one or more UE beam refinements, multiple sets of channel state information reference signals (CSI-RSs), wherein each set of CSI-RSs is associated with a same network node transmit beam associated with a network node beam refinement;
transmitting multiple CSI-RSs, wherein one CSI-RS of the multiple CSI-RSs is associated with one set of CSI-RSs of the multiple sets of CSI-RSs, and wherein a beam associated with the one CSI-RS corresponds to a beam associated with the one set of CSI-RSs; and
receiving multiple channel quality indicator (CQI) reports based at least in part on the multiple CSI-RSs, wherein one CQI report of the multiple CQI reports is based at least in part on the one CSI-RS of the multiple CSI-RSs.

26. The method of claim 25, wherein the multiple sets of CSI-RSs are associated with multiple procedure 3 (P3) procedures of the one or more UE beam refinements.

27. The method of claim 25, further comprising:
selecting a best network node beam based at least in part on the multiple CQI reports.

28. The method of claim 25, wherein an ordering associated with the multiple sets of CSI-RSs, the multiple CSI-RSs, and the multiple CQI reports is based at least in part on a predefined ordering scheme.

29. The method of claim 25, further comprising:
transmitting, prior to transmitting the multiple sets of CSI-RSs, a plurality of CSI-RSs associated with a procedure 2 (P2) procedure of the network node beam refinement; and
receiving a P2 measurement report indicating top beams.

30. The method of claim 25, further comprising:
transmitting, after the multiple CQI reports are received, a beam switch indication.

* * * * *